(12) United States Patent
Yamazaki et al.

(10) Patent No.: US 10,198,919 B2
(45) Date of Patent: Feb. 5, 2019

(54) SYSTEM, APPARATUS AND METHOD FOR HAPTIC COMMANDS

(71) Applicant: LENOVO (Singapore) PTE. LTD., New Tech Park (SG)

(72) Inventors: Mitsuhiro Yamazaki, Yokohama (JP); Atsushi Nagashima, Yokohama (JP); Fusanobu Nakamura, Yokohama (JP); Kazunori Yamamura, Yokohama (JP)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 15/687,978

(22) Filed: Aug. 28, 2017

(65) Prior Publication Data

US 2018/0061194 A1 Mar. 1, 2018

(30) Foreign Application Priority Data

Aug. 26, 2016 (JP) .................................. 2016-165198

(51) Int. Cl.
*B06B 1/02* (2006.01)
*B06B 1/04* (2006.01)
(Continued)

(52) U.S. Cl.
CPC .............. *G08B 6/00* (2013.01); *B06B 1/0215* (2013.01); *B06B 1/045* (2013.01); *B06B 1/161* (2013.01);
(Continued)

(58) Field of Classification Search
CPC . A63D 2300/037; A63F 13/06; A63F 13/285; B06B 1/0215; B06B 1/0253;
(Continued)

(56) References Cited

U.S. PATENT DOCUMENTS 5,917,268 A * 6/1999 Takagi .................. H02N 2/004
310/317
6,100,622 A * 8/2000 Yamamoto .............. H02N 2/14
310/316.01
(Continued)

FOREIGN PATENT DOCUMENTS

JP 10052078 A 2/1998
JP 2004-181305 A 7/2004
(Continued)

*Primary Examiner* — Quan-Zhen Wang
*Assistant Examiner* — Stephen R Burgdorf
(74) *Attorney, Agent, or Firm* — Kunzler, PC (57) ABSTRACT

A system, apparatus and method are disclosed. The system includes a command module that generates haptic commands; a haptic actuator; a drive circuit that applies a first driving voltage in response to a first haptic command and applies a second driving voltage in response to a second haptic command. The apparatus includes a haptic actuator; a DC power supply; a first power supply circuit that outputs a first DC voltage; a second power supply circuit that outputs a second DC voltage higher than the first DC voltage; a drive circuit that applies a first driving voltage and a second driving voltage; and a controller that designates an operating mode. The method includes generating a first haptic command and a second haptic command; applying a first driving voltage to a haptic actuator; and applying a second driving voltage to the haptic actuator.

18 Claims, 8 Drawing Sheets

(51) Int. Cl.
  *B06B 1/16* (2006.01)
  *G06F 3/01* (2006.01)
  *G08B 6/00* (2006.01)
  *H02K 7/06* (2006.01)
  *H02K 33/02* (2006.01)

(52) U.S. Cl.
  CPC ............ *G06F 3/016* (2013.01); *H02K 7/061* (2013.01); *H02K 33/02* (2013.01)

(58) Field of Classification Search
  CPC ...... B06B 1/0276; B06B 1/045; F16F 7/1005; G06F 1/3203; G06F 1/3287; G06F 3/016; G06F 3/041; G06F 2203/013; G06F 2203/015; G08B 6/00; H02K 7/061; H02N 2/0075; H02N 2/14
  USPC ..................................................... 340/407.2
  See application file for complete search history.

(56) References Cited

U.S. PATENT DOCUMENTS

| | | | | |
|---|---|---|---|---|
| 7,876,288 | B1* | 1/2011 | Huang | G06F 1/1616 345/178 |
| 8,854,319 | B1* | 10/2014 | Nickson | G06F 3/041 340/407.1 |
| 9,448,613 | B1* | 9/2016 | Liljegren | G08B 6/00 |
| 9,729,730 | B2* | 8/2017 | Levesque | H04M 19/04 |
| 9,764,357 | B2* | 9/2017 | Houston | B06B 1/166 |
| 2005/0219206 | A1* | 10/2005 | Schena | G06F 3/016 345/156 |
| 2008/0064499 | A1* | 3/2008 | Grant | G06F 3/016 463/36 |
| 2009/0069081 | A1* | 3/2009 | Thorner | G06F 3/011 463/30 |
| 2009/0313542 | A1* | 12/2009 | Cruz-Hernandez | G06F 3/016 715/702 |
| 2013/0222309 | A1* | 8/2013 | Sun | G06F 3/016 345/173 |
| 2014/0070665 | A1* | 3/2014 | Muggler | G06F 1/32 310/314 |
| 2014/0118126 | A1* | 5/2014 | Garg | G06F 3/016 340/407.1 |
| 2015/0227204 | A1* | 8/2015 | Gipson | G06F 3/016 345/156 |
| 2016/0055726 | A1* | 2/2016 | Aldossary | G08B 6/00 340/407.1 |
| 2016/0062465 | A1* | 3/2016 | Moussette | G08B 6/00 345/156 |
| 2016/0334871 | A1* | 11/2016 | Levesque | G06F 3/016 |
| 2017/0090573 | A1* | 3/2017 | Hajati | G06F 3/016 |
| 2017/0156971 | A1* | 6/2017 | Topolovac | A61H 19/40 |

FOREIGN PATENT DOCUMENTS

| | | |
|---|---|---|
| JP | 2006136865 A | 6/2006 |
| JP | 2007122501 A | 5/2007 |
| JP | 2011097747 A | 5/2011 |
| JP | 2014193451 A | 10/2014 |
| JP | 2015083305 A | 4/2015 |
| JP | 2015116508 A | 6/2015 |
| JP | 2015157276 A | 9/2015 |

\* cited by examiner

SYSTEM, APPARATUS AND METHOD FOR HAPTIC COMMANDS

CROSS-REFERENCE TO RELATED APPLICATIONS

This patent application claims priority to Japan Patent Application No. JP2016-165198 filed on 26 Aug. 2016 for Yamazaki, et al., the entire contents of which are incorporated herein by reference for all purposes.

FIELD

The subject matter disclosed herein relates to haptic feedback and more particularly relates to generating haptic feedback with perceptions of different characteristics.

BACKGROUND

Electronic apparatuses such as tablet terminals, smartphones, mobile phones, and computers may be provided with haptic actuators that give impact type haptic feedback and vibration type haptic feedback. However, current designs require separate haptic actuators for each type of haptic feedback, which uses more space and increases costs.

BRIEF SUMMARY

A system, apparatus and method are disclosed.

The system includes a command module that generates a first haptic command and a second haptic command; a haptic actuator that vibrates with a magnitude varying in accordance with a magnitude of a driving voltage; and a drive circuit that applies a first driving voltage to the haptic actuator in response to the first haptic command, and applies a second driving voltage larger than the first driving voltage to the haptic actuator in response to the second haptic command; wherein a time for which the second driving voltage is applied is shorter than a time for which the first driving voltage is applied.

The apparatus includes a haptic actuator that operates in a vibration mode and an impact mode; a DC power supply; a first power supply circuit that outputs an output voltage from the DC power supply as a first DC voltage; a second power supply circuit, comprising a booster that steps up an output voltage to a second DC voltage higher than the first DC voltage; a drive circuit that applies, to the haptic actuator, a first driving voltage generated from the first DC voltage in the vibration mode, and applies, to the haptic actuator, a second driving voltage generated from the second DC voltage in the impact mode; and a controller that designates an operating mode of the haptic actuator to the drive circuit.

The method includes generating a first haptic command and a second haptic command; applying, in response to the first haptic command, a first driving voltage to a haptic actuator for a predetermined time; and applying, in response to the second haptic command, a second driving voltage higher than the first driving voltage to the haptic actuator for a time shorter than the predetermined time.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
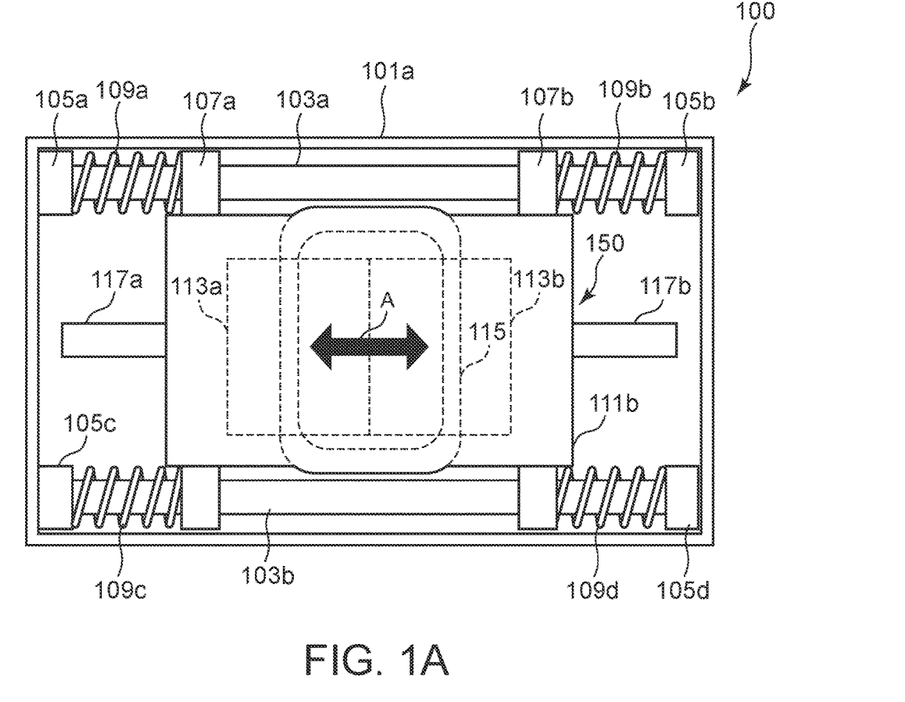
FIGS. 1A and 1B are a plan view and a cross-sectional view, respectively, schematically showing a configuration of an actuator 100 according to an embodiment of the present invention.
Figure 1B:
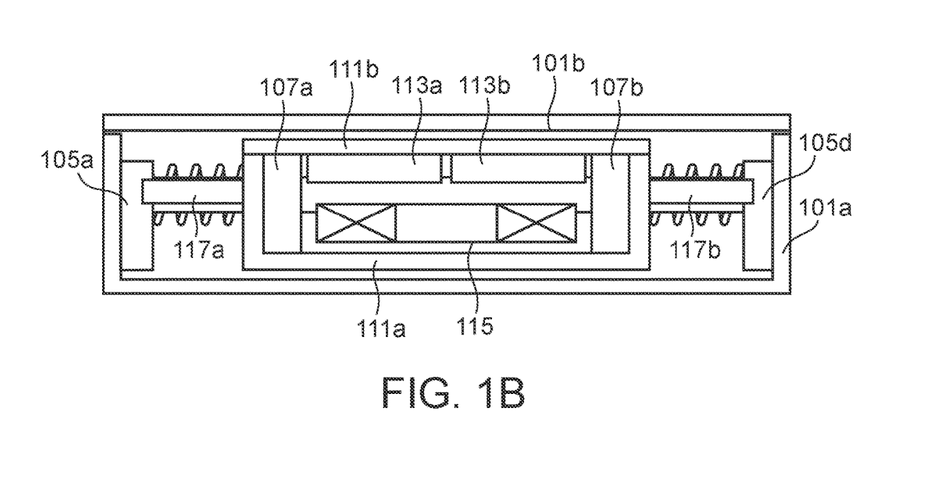

FIGS. 1A and 1B schematically show an example of a dual mode haptic actuator (hereinafter, "actuator") 100 according to an embodiment of the present invention. The actuator 100 operates in both a vibration mode and an impact mode with its power supply controlled. Here, the vibration mode is an operating mode in which the actuator 100 produces a stable vibration in a steady state. The impact mode corresponds to an operating mode in which the actuator 100 produces a transient vibration that lasts a short time from the application of a voltage until it enters a steady state or until immediately after it has entered the steady state.

Figure 8:
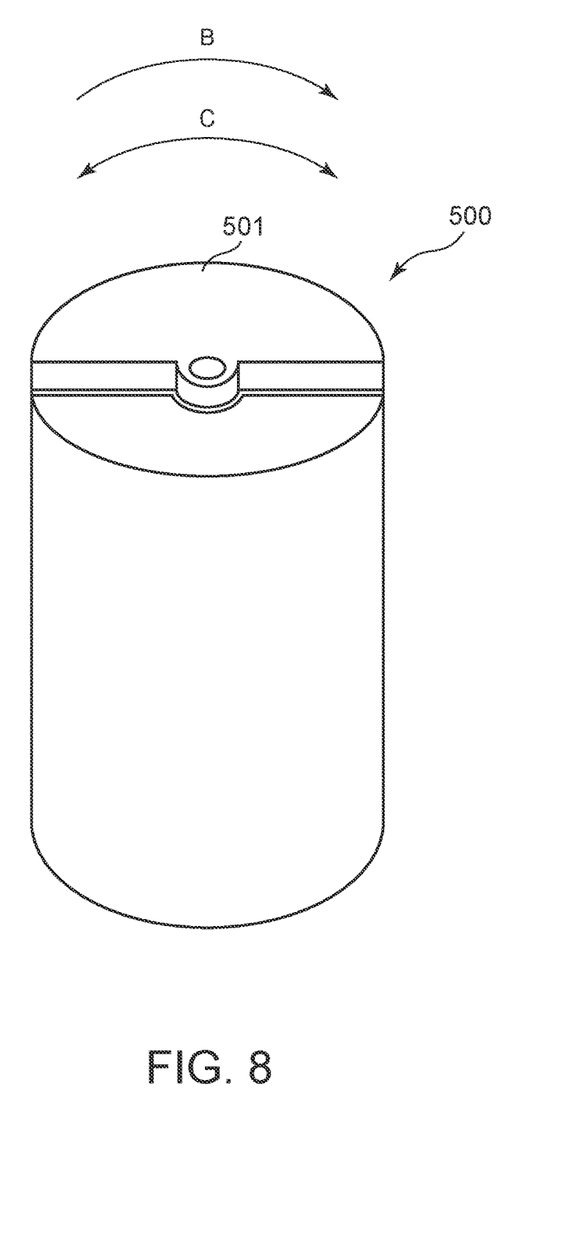
FIG. 8 illustrates a rotary dual mode haptic actuator to which the present invention can be applied.

In the impact mode, the vibration amplitude and the vibration acceleration are greater than in the vibration mode. In the present embodiment, a description will be made, by way of example, about the actuator 100 adopting the principle of a linear resonant actuator ("LRA"), although the present invention is also applicable to a rotary dual mode haptic actuator as shown in FIG. 8. The actuator 100 has a vibration mechanism including a movable element 150, which is stored in a lower chassis 101a and an upper chassis 101b. FIG. 1A is a plan view with the upper chassis 101b removed, and FIG. 1B is a cross-sectional view taken at the center in the longitudinal direction.

Shafts 103a and 103b, arranged at each side, have their respective ends fixed to the lower chassis 101a via securing portions 105a to 105d. The shafts 103a and 103b penetrate through corresponding ends of weights 107a and 107b to allow the weights 107a, 107b to perform a reciprocating linear motion. Compression coil springs 109a to 109d are disposed between the securing portions 105a to 105d and the weights 107a, 107b. Magnets 113a and 113b of different magnetic pole directions are attached to a lower surface of an upper yoke 111b. A coil 115 is disposed in a coil space formed by the upper yoke 111b and a lower yoke 111a.

The coil 115 is fixed to the lower chassis 101a via a securing member (not shown). The magnetic flux emitted from the magnets 113a, 113b flow through the magnetic path configured with the upper yoke 111b, the lower yoke 111a, and the coil space. The lower yoke 111a has end surfaces in the vibration directions to which shafts 117a and 117b are fixed. The upper yoke 111b, the lower yoke 111a, the weights 107a and 107b, the magnets 113a and 113b, and the shafts 117a and 117b constitute the movable element 150. It should be noted that the actuator 100 may be configured such that the movable element includes the coil and that the magnets and yokes are fixed to the lower chassis 101a.

In the actuator 100, when an alternating current having a frequency f equivalent to the resonant frequency f0 of the movable element 150 is made to flow through the coil 115 in the vibration mode, the movable element 150 vibrates as it performs a reciprocating linear motion in the directions of the arrow A, due to the Lorentz force occurring in the coil 115 by the magnetic field generated by the magnets 113a, 113b, and the elastic force of the compression coil springs 109a to 109d. The vibration caused by the reciprocating operation of the movable element 150 propagates to the lower chassis 101a and the upper chassis 101b.

Figure 2:
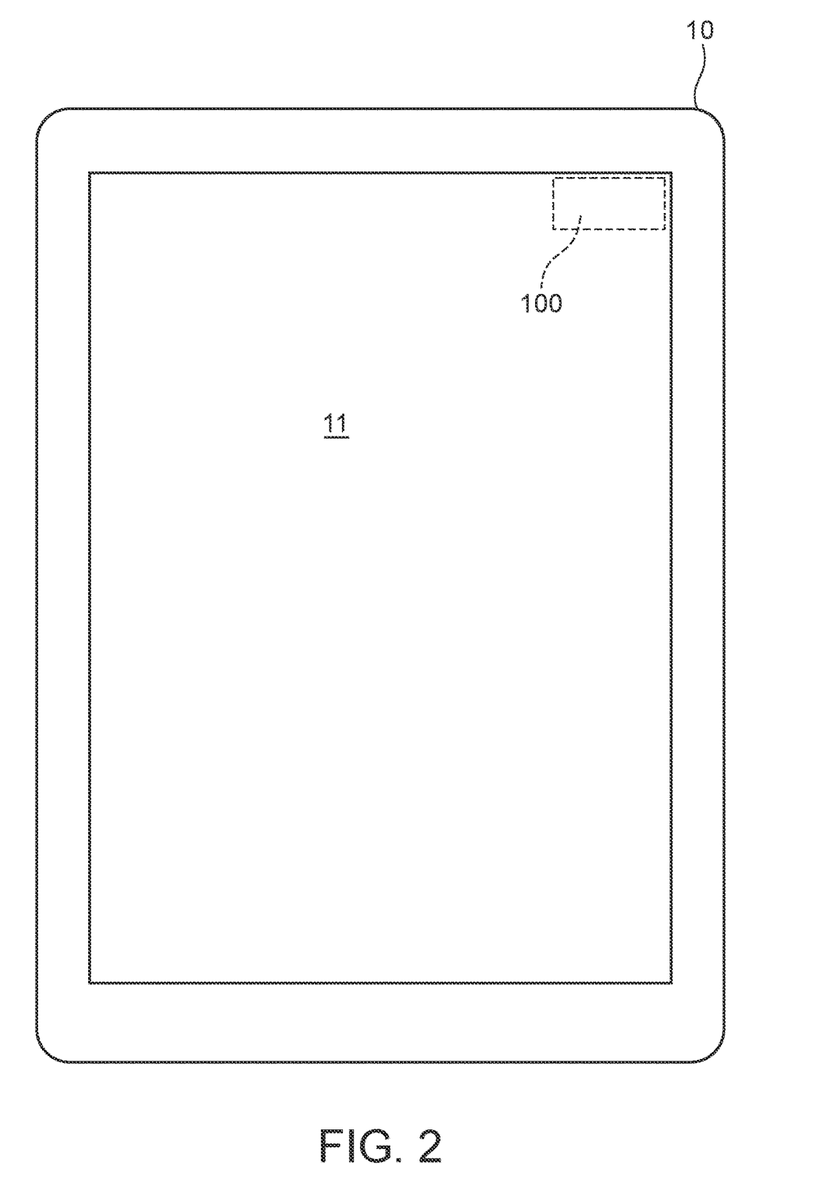
FIG. 2 is a plan view of a smartphone 10 equipped with the actuator 100.

The amplitude of the movable element 150 in the vibration mode is set such that the tip ends of the shafts 117a, 117b will not touch the inner surface of the lower chassis 101a. The amplitude of the movable element 150 in the impact mode is greater than the amplitude in the vibration mode. In an example, it may be configured such that the tip ends of the shafts 117a, 117b strike against the lower chassis 101a in the impact mode. The shafts 117a and 117b can be omitted in a case where they are configured not to strike against the lower chassis 101a. The actuator 100 can be attached to the chassis of a smartphone 10 or on an inner side of a touch screen 11, as shown in FIG. 2, for example.

Figure 3:
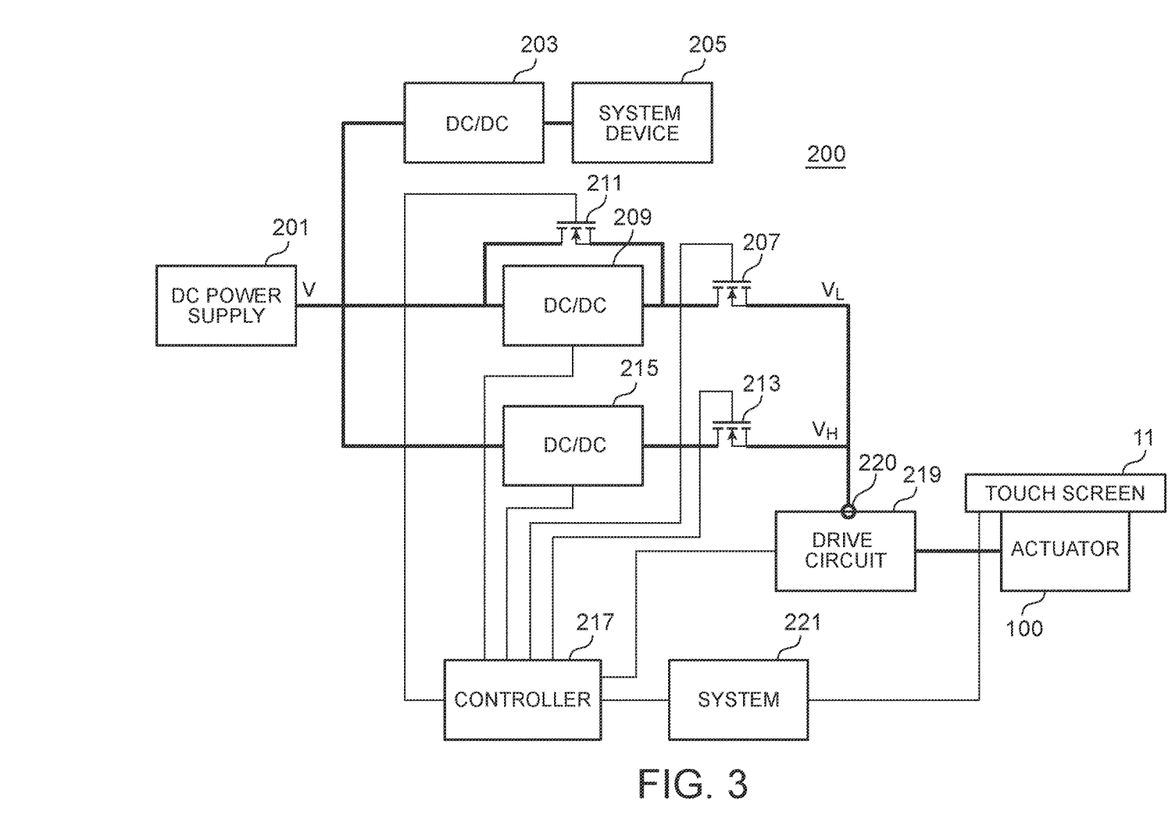
FIG. 3 is a functional block diagram illustrating a configuration of a haptic feedback system 200 mounted on the smartphone 10.

FIG. 3 is a functional block diagram illustrating a configuration of a haptic feedback actuator 200 mounted on the smartphone 10. In FIG. 3, the bold lines indicate the power lines, and the thin lines indicate the signal lines. In the present embodiment, by way of example, a DC power supply 201 is configured with a single-cell lithium-ion battery, a battery controller, a charger, etc. The smartphone 10 operates in a mobile environment, with only the lithium-ion battery as the power supply. The voltage range of an output voltage V from the DC power supply 201 is determined by the discharge end voltage (3.2 V) and the charge end voltage (4.2 V) of the lithium-ion battery.

A voltage regulator 203 converts the output voltage V from the DC power supply 201 to a plurality of working voltages required by a system device 205. The system device 205 is configured with a semiconductor chip (SoC) having the functions of CPU, system memory, and I/O interface incorporated therein, and an I/O device such as a camera, a speaker, a touch screen 11, and a wireless module. It should be noted that the hardware of a system 221 constitutes the system device 205.

Generally, a voltage regulator is higher in efficiency with smaller difference between the input voltage and the output voltage. The efficiency of the voltage regulator 203 becomes more favorable as the working voltage of the system device 205 is closer to the output voltage V of the DC power supply 201. A drive circuit 219 has a common input terminal 220 to which a DC voltage VH is applied in the impact mode and a DC voltage VL is applied in the vibration mode. The drive circuit 219 converts the DC voltage VH, VL to an AC driving voltage, for application to the coil 115 of the actuator 100.

The voltage range of the DC voltage VH can be set to 9 to 12 V, by way of example, and the voltage range of the DC voltage VL can be set to the voltage range (3.2 V to 4.2 V) of the DC power supply 201, by way of example. The waveform of the driving voltage is not particularly limited; sinusoidal wave, triangular wave, rectangular wave, etc. may be adopted. The waveform in the impact mode may be the same as or different from the waveform in the vibration mode.

The drive circuit 219 does not step down or up the voltage inside; rather, it outputs a driving voltage generated from the DC voltage VH in the impact mode and outputs a driving voltage generated from the DC voltage VL in the vibration mode. The driving voltage generated from the DC voltage VH is larger than the driving voltage generated from the DC voltage VL. The drive circuit 219 may be configured to receive only the DC voltage VH at the input terminal 220 and perform PWM control to step down the voltage to output a driving voltage appropriate for the vibration mode. However, when converting a voltage, a switching regulator suffers greater power loss with larger voltage difference between the input and the output. Therefore, the drive circuit 219 can operate efficiently by receiving the DC voltages VH and VL, without the need to internally perform the voltage conversion to obtain a driving voltage.

A bypass switch 211 supplies the output voltage V of the DC power supply 201 directly to the drive circuit 219 as the DC voltage VL. A booster 209 is operable, in response to an event that the output voltage V from the DC power supply 201 has decreased to a level with which the actuator 100 cannot produce an adequate vibration in the vibration mode, to step up the voltage to be applied to the drive circuit 219. The booster 209 may be omitted if the drive circuit 219 is able to properly drive the actuator 100 in the voltage range of the DC power supply 201.

A booster 215 steps up the output voltage V from the DC power supply 201 to a DC voltage VH, for supplying to the drive circuit 219. A switch 207 is on when the actuator 100 operates in the vibration mode, while it is off when the actuator 100 operates in the impact mode. A switch 213 is on when the actuator 100 operates in the impact mode, while it is off when the actuator 100 operates in the vibration mode.

A controller 217 controls the operations of the switches 207, 211, 213, the boosters 209, 215, and the drive circuit 219, in accordance with a haptic command received from the system 221 and the output voltage V from the DC power supply 201. The system 221 is configured through cooperation of the hardware such as the system device 205 and the software such as the device driver, OS, and application. The system 221 gives a timing of generating haptic feedback, and notifies the controller 217 of a haptic command including an identifier for the impact mode or the vibration mode. The system 221 further notifies the controller 217 of the output voltage of the DC power supply 201, at regular intervals.

Here, it may be conceivable to connect battery cells of the DC power supply 201 in series to increase the output voltage V to a DC voltage VH, and to supply the DC voltage VH and a DC voltage VL stepped down by a voltage regulator to the drive circuit 219. In this case, the voltage regulator that steps down the voltage for applying to the system device 205 suffers degradation in efficiency. Further, disposing a single cell battery in the smartphone 10 is advantageous in that the space occupied in the chassis decreases as compared to the case of connecting a plurality of batteries in series.

Figure 4:
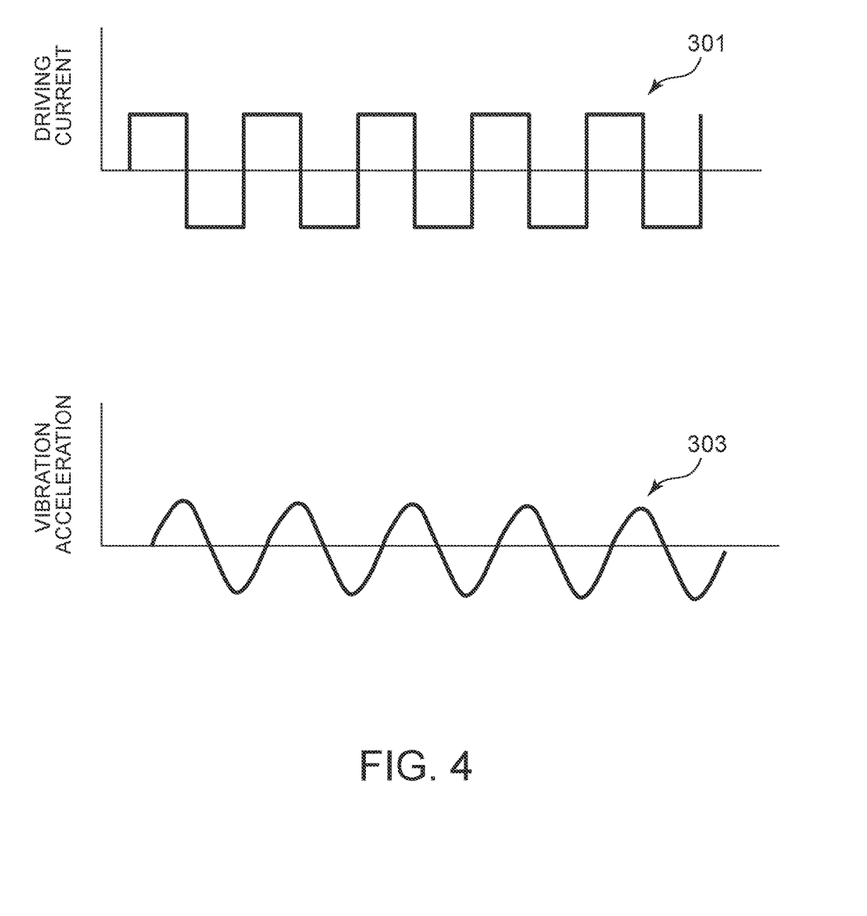
FIG. 4 illustrates a situation where the actuator 100 attached to the smartphone 10 operates in a vibration mode.

FIG. 4 illustrates a situation where the actuator 100 attached to the smartphone 10 operates in the vibration mode. The driving current 301 indicates a current that flows through the coil 115 when the drive circuit 219 applies a square wave driving voltage generated from the DC voltage VL. The vibration acceleration 303 indicates an acceleration in the vibration axis direction of the actuator 100 occurring in the chassis of the smartphone 10. The vibration acceleration corresponds to the amplitude of the movable element 150.

The frequency f of the driving voltage applied in the vibration mode is set to a value equal to or close to the resonant frequency f0 of the movable element. In the actuator 100, the movable element 150 vibrates at an approximately constant amplitude after a lapse of a transient state immediately after the application of the driving voltage. FIG. 4 shows the state where the vibration has become stable a certain time after the application of the driving voltage. In the vibration mode, a steady-state vibration is utilized, so the transient vibration poses no problem for use.

Figure 5:
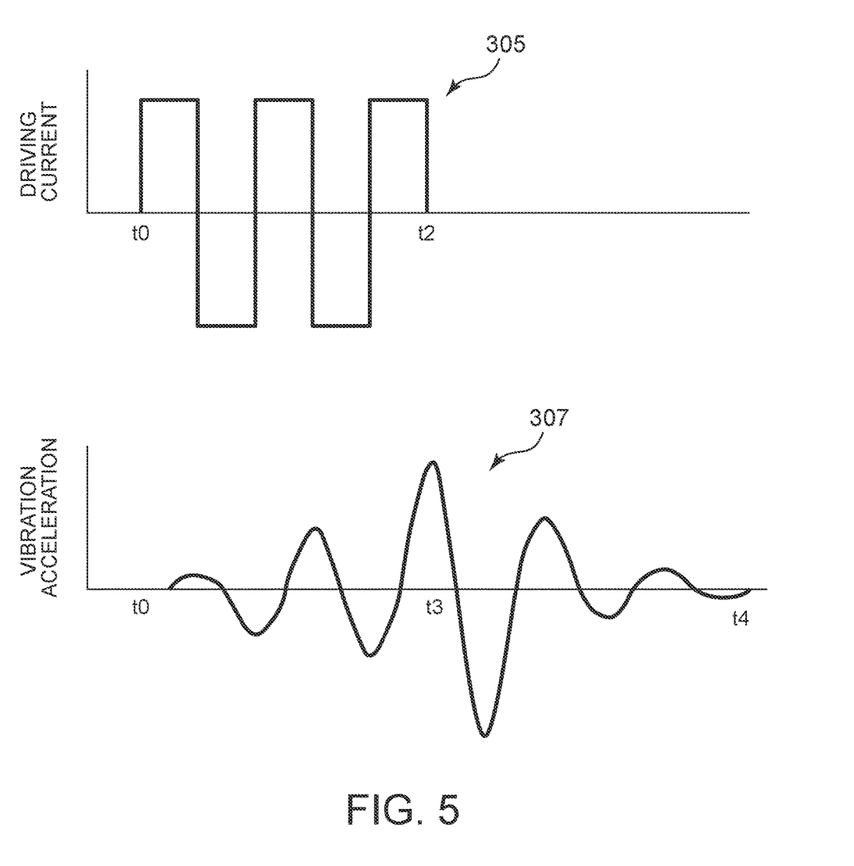
FIGS. 5 and 6 each illustrate a situation where the actuator 100 attached to the smartphone 10 operates in an impact mode.
Figure 6:
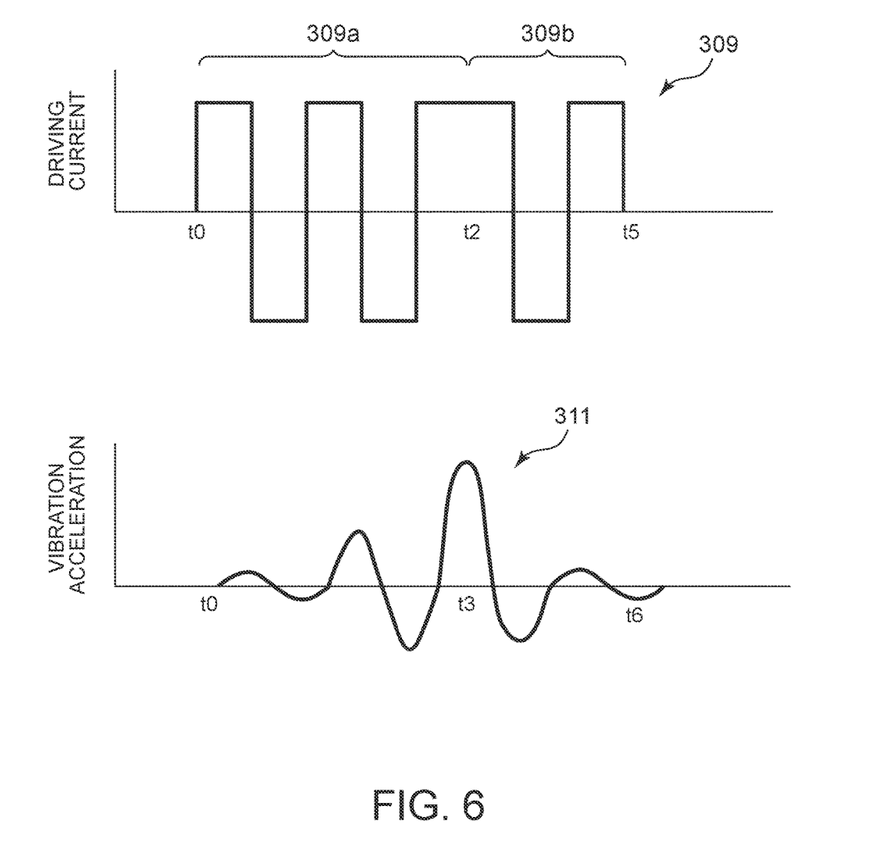

FIGS. 5 and 6 each illustrate a situation where the actuator 100 attached to the smartphone 10 operates in the impact mode. In FIG. 5, the driving current 305 indicates a current that flows through the coil 115 when the drive circuit 219 applies a square wave driving voltage generated from the DC voltage VH to the coil 115 at time t0. The vibration acceleration 307 indicates a transient acceleration in the vibration axis direction of the actuator 100 that has occurred in the chassis of the smartphone 10 when the application of the driving voltage was started at time t0 and stopped at time t2.

The square wave driving voltage converted from the DC voltage VH is higher in peak value than the square wave driving voltage converted from the DC voltage VL, so, at time t3, the maximum value of the vibration acceleration reaches the value higher than that of the vibration acceleration 303. If the driving voltage is applied continuously after time t2, the vibration will continue, at the maximum acceleration at the time t3, to produce a steady vibration. The steady vibration in this case, however, is not appropriate for the use in the vibration mode, because it is unnecessarily large, consuming much energy.

In order to cause the actuator 100 to operate in the impact mode, the drive circuit 219 stops the driving voltage at time t2 after a lapse of a predetermined time, or at time t2 after counting a predetermined number of pulses. After the time t2, there is no exciting force, so the movable element attenuates in free vibration, and the vibration becomes unnoticeable by a human at time t4. A human senses the strong vibration that lasts a short time from time t0 to time t4 as a transient vibration, or, an impact.

The time t2 at which the driving voltage is stopped as the maximum acceleration is reached or the number of applied pulses can be determined in advance by experiments. The frequency f of the driving voltage applied in the impact mode can be set to the resonant frequency f0. In the impact mode, it is desirable to reach the maximum acceleration in a shortest possible time, so as to be able to address high-speed keystrokes on the keyboard. It has been confirmed through experiments that the frequency f in the impact mode with which the maximum acceleration is reached in a much shorter time can be determined from between the resonant frequency f0 and a frequency about 10% higher than the resonant frequency f0, in accordance with the inertia of the movable element 150 as well as the spring constants of the compression coil springs 109a to 109d.

In the impact mode, the amplitude of the movable element 150 is larger than that in the vibration mode. When it is configured such that the shafts 117a, 117b strike against the lower chassis 101a during the vibration at the maximum amplitude in the impact mode, a still stronger transient vibration can be provided. The vibration acceleration 307 shows that after time t2, free vibration (residual vibration) occurs in the actuator 100 in accordance with the spring constants and the inertia of the movable element 150. In the impact mode, after the occurrence of the vibration at the maximum acceleration, it is desirable to stop the vibration quickly so as to be able to address the high-speed keystrokes on the keyboard. To this end, it is necessary to forcibly attenuate the residual vibration in a short time.

FIG. 6 shows a driving current 309 and a vibration acceleration 311 when a mechanism of attenuating the residual vibration in the impact mode is incorporated into the drive circuit 219. The behavior from time t0 to time t3 at which the maximum acceleration occurs is identical to that in FIG. 5. The driving current 309 includes a driving current 309a corresponding to the driving voltage and a damping current 309b corresponding to a damping voltage. When the application of the driving voltage is stopped at time t2 corresponding to the time point when the movable element 150 has moved to the maximum amplitude in one direction, the movable element 150 starts moving in the other direction with free vibration.

The damping current 309b has a phase 180 degrees ahead of that of the driving current 309a. The drive circuit 219 stops the driving voltage at time t2 and applies the damping voltage until time t5. The damping current 309b functions as the damping force for the movable element 150, so the vibration acceleration 311 attenuates to reach a level where the vibration becomes unnoticeable by a human at time t6, taking a shorter time than the vibration acceleration 307 that attenuates to reach that level at time t4. The frequency, magnitude, period of application, and time of application of the damping current 309b can be determined through experiments for each actuator 100.

Figure 7:
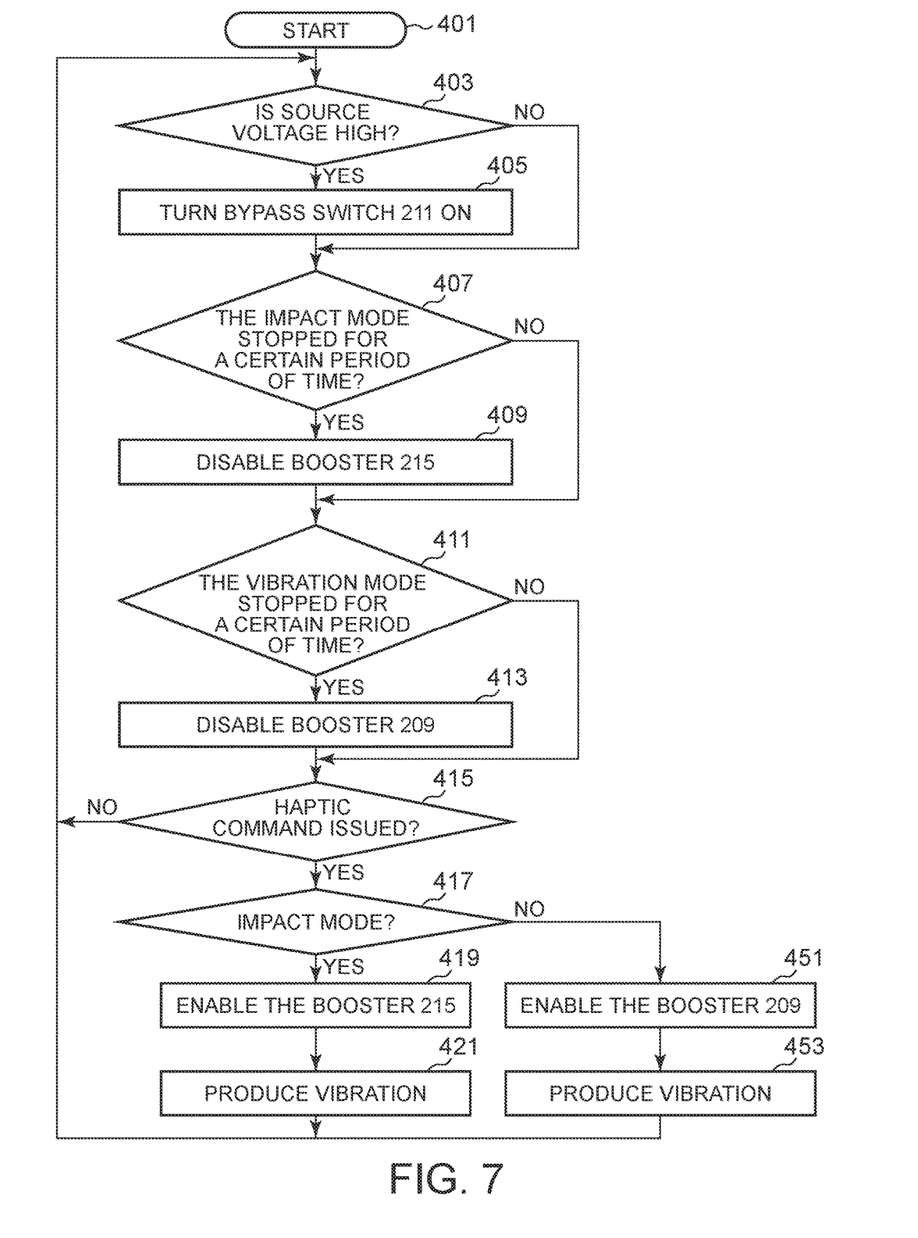
FIG. 7 is a flowchart illustrating an operation of the haptic feedback system 200.

FIG. 7 is a flowchart illustrating an operation of the haptic feedback system 200. In block 401, the smartphone 10 starts the operation. The controller 217 receives the output voltage V of the DC power supply 201 from the system 221 at regular intervals. In block 403, if the controller 217 determines that it is possible to operate the actuator 100 in the vibration mode with the output voltage V of the DC power supply 201, in block 405, the controller 217 turns on the bypass switch 211, and proceeds to block 407. If it determines that the output voltage V is low, it proceeds to block 407, while keeping the bypass switch 211 off.

In block 407, if the controller 217 has not received a haptic command indicating the impact mode from the system 221 for a certain period of time and the booster 215 has been enabled at the time point, then in block 409, the controller 217 disables the booster 215. At this time, the controller 217 turns off the switch 213. In block 411, if the controller 217 has not received a haptic command indicating the vibration mode from the system 221 for a certain period of time and the booster 209 has been enabled at the time point, then in block 413, the controller 217 disables the booster 209. At this time, the controller 217 turns off the switch 207.

In block 415, the system 221 issues a haptic command. The haptic command includes an identifier for an operating mode, and the timing of issuance indicates the timing of occurrence of haptic effect. In an example, the system 221 generates a haptic command indicating the vibration mode when notifying a user of an incoming mail or push notification from a Web site.

In an example, when the system 221 receives a tap manipulation on an icon on the touch screen 11 or an event according to a keystroke on the software keyboard, the system 221 generates a haptic command indicating the impact mode. In block 417, if the controller 217 has received a haptic command for the impact mode, it proceeds to block 419; if it has received a haptic command for the vibration mode, it proceeds to block 451.

In block 419, the controller 217 enables the booster 215 if it has been disabled, and turns on the switch 213. As a result, the DC voltage VH is applied to the drive circuit 219. In block 421, the controller 217 outputs a trigger signal to the drive circuit 219 every time it receives a haptic command for the impact mode from the system 221. When the drive circuit 219 outputs a driving voltage generated from the DC voltage VH to the coil 115 in response to the trigger signal, the actuator 100 operates in the impact mode.

In block 451, when the bypass switch 211 is off and the booster 209 has been disabled, the controller 217 enables the booster 209 and turns on the switch 207. When the bypass switch 211 is on, the controller 217 turns on the switch 207, refraining from enabling the booster 209. As a result, the DC voltage VL is applied to the drive circuit 219. In block 453, the controller 217 outputs a trigger signal to the drive circuit 219 every time it receives a haptic command for the vibration mode from the system 221. When the drive circuit 219 outputs a driving voltage generated from the DC voltage VL to the coil 115 in response to the trigger signal, the actuator 100 operates in the vibration mode.

The present invention is also applicable to a rotary actuator 500 such as an ERM, as shown in FIG. 8, which uses a motor to cause an eccentric weight 501 to rotate in one direction (arrow B) or to rotate in both directions like a pendulum (arrow C). As in the case of the actuator 100, it is possible to cause the actuator 500 to operate in the vibration mode and in the impact mode with the rotational operation or the bidirectional rotational operation of the eccentric weight 501 when controlling the driving voltage and the application time.

While the present invention has been described by giving a specific embodiment illustrated in the drawings, it is needless to say that the present invention is not limited to the illustrated embodiment; rather, any configurations known to date can be adopted as long as they can exert the effects of the present invention.

DESCRIPTION OF SYMBOLS

10: smartphone
11: touch screen
100: dual mode haptic actuator
101a: lower chassis
101b: upper chassis
103: shaft
105: securing portion
107: weight
109: compression coil spring
111a: lower yoke
111b: upper yoke
113: magnet
115: coil
117a, 117b: shaft
200: haptic feedback system
301, 305, 309: driving current
303, 307, 311: vibration acceleration Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for generating haptic effects, comprising:
 a command module that generates a first haptic command and a second haptic command;
 a haptic actuator that vibrates with a magnitude varying in accordance with a magnitude of a driving voltage; and
 a drive circuit comprising a first power supply circuit comprising a first booster, and a second power supply circuit comprising a second booster that
  applies a first driving voltage from the first power supply circuit and the first booster to the haptic actuator in response to the first haptic command,
  applies a second driving voltage larger than the first driving voltage from the second power supply circuit and the second booster to the haptic actuator in response to the second haptic command, and steps up the first driving voltage with the first booster in response to a decrease of the first driving voltage;

wherein a time for which the second driving voltage is applied is shorter than a time for which the first driving voltage is applied.

2. The system of claim 1, wherein
the haptic actuator comprises a movable element that performs a reciprocating linear operation through cooperation of a coil and a magnet.

3. The system of claim 2, wherein
the second driving voltage has a frequency higher than a frequency of the first driving voltage.

4. The system of claim 3, wherein
the drive circuit applies a damping voltage following the second driving voltage to suppress free vibration of the movable element.

5. The system of claim 2, wherein
the haptic actuator is stored in a case; and
a part of the movable element strikes against the case in response to application of the second driving voltage.

6. The system of claim 1, wherein
the haptic actuator comprises an eccentric weight that performs a rotational motion through cooperation of a coil and a magnet.

7. The system of claim 1, wherein
the haptic actuator comprises an eccentric weight that performs a bidirectional rotational motion through cooperation of a coil and a magnet.

8. An electronic apparatus, comprising:
a haptic actuator that operates in a vibration mode and an impact mode;
a DC power supply;
a first power supply circuit that outputs an output voltage from the DC power supply as a first DC voltage;
a second power supply circuit, comprising a booster that steps up an output voltage to a second DC voltage higher than the first DC voltage;
a drive circuit that
    applies, to the haptic actuator, a first driving voltage generated from the first DC voltage in the vibration mode, and
    applies, to the haptic actuator, a second driving voltage generated from the second DC voltage in the impact mode; and
a controller that designates an operating mode of the haptic actuator to the drive circuit;
wherein the first power supply circuit includes a booster that steps up the output voltage of the first power supply circuit in response to a decrease of the output voltage of the first power supply circuit.

9. The apparatus of claim 8, wherein the DC power supply comprises a single cell battery.

10. The apparatus of claim 8, wherein the controller stops the booster of the second power supply circuit after a predetermined period of time has passed in which the controller has not designated the impact mode.

11. The apparatus of claim 8, wherein the first power supply circuit includes a bypass switch that bypasses the booster of the first power supply circuit.

12. The apparatus of claim 8, wherein the controller stops the booster of the first power supply circuit after a predetermined period of time has passed and the controller has not designated the vibration mode.

13. The apparatus of claim 8, wherein the drive circuit generates the second driving voltage without stepping down the second DC voltage.

14. A method, comprising
generating a first haptic command and a second haptic command;
generating a first driving voltage with a first power supply circuit that comprises a first booster;
generating a second driving voltage with a second power supply circuit that comprises a second booster;
applying, in response to the first haptic command, the first driving voltage to a haptic actuator for a predetermined time;
applying, in response to the second haptic command, the second driving voltage, higher than the first driving voltage to the haptic actuator for a time shorter than the predetermined time; and
stepping up the first driving voltage with the first booster in response to a decrease in the first driving voltage.

15. The method of claim 14, further comprising
striking a case with the haptic actuator in response to application of the second driving voltage.

16. The method of claim 14, further comprising
applying a damping voltage to the haptic actuator after applying the second driving voltage.

17. The method of claim 14, wherein
the second driving voltage has a frequency higher than a frequency of the first driving voltage.

18. The method of claim 14, further comprising
stepping up the second driving voltage with the second booster; and
stopping the second booster after a predetermined amount of time has passed after applying the second driving voltage to the haptic actuator.

* * * * *